United States Patent
Hehl

[19]
[11] Patent Number: 6,026,696
[45] Date of Patent: Feb. 22, 2000

[54] DEVICE FOR CONVERTING A ROTARY MOTION INTO AN AXIAL MOTION

[76] Inventor: Karl Hehl, Arthur–Hehl–Str. 32, D-72290 Lossburg, Germany

[21] Appl. No.: 09/068,532

[22] PCT Filed: Nov. 12, 1996

[86] PCT No.: PCT/DE96/02170

§ 371 Date: May 13, 1998

§ 102(e) Date: May 13, 1998

[87] PCT Pub. No.: WO97/18406

PCT Pub. Date: May 22, 1997

[30] Foreign Application Priority Data

Nov. 14, 1995 [DE] Germany .............................. 195 42 453

[51] Int. Cl.[7] .................................................. F16H 25/22
[52] U.S. Cl. ...................... 74/89.15; 74/411; 74/424.8 C; 74/459
[58] Field of Search ............................ 74/89.15, 424.8 R, 74/424.8 C, 459, 411

[56] References Cited

U.S. PATENT DOCUMENTS

| | | | |
|---|---|---|---|
| 2,683,379 | 7/1954 | Strandgren | 74/424.8 C |
| 2,966,070 | 12/1960 | Wise . | |
| 3,691,858 | 9/1972 | Wilke | 74/89.15 |
| 4,442,725 | 4/1984 | Urabe | 74/89.15 |
| 4,479,397 | 10/1984 | Jelinek et al. | 74/89.15 |
| 4,498,350 | 2/1985 | Ross | 74/89.15 |
| 4,586,392 | 5/1986 | Nilsson | 74/89.15 |
| 4,802,558 | 2/1989 | Garnett . | |
| 5,035,120 | 7/1991 | Ouilliou . | |

FOREIGN PATENT DOCUMENTS

| | | |
|---|---|---|
| 50 843 | 7/1988 | Austria . |
| 1 043 743 | 4/1959 | Germany . |
| 1 216 642 | 5/1966 | Germany . |
| 4115 758 A1 | 11/1992 | Germany . |
| 4407 537 A1 | 9/1994 | Germany . |
| 4324 838 A1 | 1/1995 | Germany . |
| 4411 651 C1 | 4/1995 | Germany . |
| 290685 | 5/1953 | Switzerland . |

*Primary Examiner*—Allan D. Herrmann
*Attorney, Agent, or Firm*—Venable; George H. Spencer; Robert Kinberg

[57] ABSTRACT

A device for converting a rotary motion into an axial motion comprises an outer tube (10) with internal contours (10a), an inner shaft (11) with head (11a) with external contours (11b), an inner chamber (R) formed between tube (10) and shaft (11) and a plurality of roller elements (12) arranged in the inner chamber (R) and around the head (11a), which are in active engagement with at least one contour with the internal contour (10a) of the tube (10) and the external contour (11b) of the head (11a), whose position can be adjusted essentially by rotation relative to the roller elements (12). The shaft (11) is surrounded by a tubular element (14) arranged coaxially with respect to the central axis (a—a) of the shaft, which moves translationally relative to the tube (10) when the device is actuated. By this the device is protected in a most simple way from exterior influences: (FIG. 2).

9 Claims, 9 Drawing Sheets

DEVICE FOR CONVERTING A ROTARY MOTION INTO AN AXIAL MOTION

CROSS REFERENCE TO RELATED APPLICATIONS

The present application claims the priority of German Patent Application 195 42 453, filed on Nov. 14, 1995, the disclosure of which is herewith also explicitly made the subject matter of the present application.

TECHNICAL FIELD

The invention concerns a device for converting a rotary motion into an axial motion, the device including: an outer tube with internal contours; an inner shaft having a head including external contours, the inner shaft having a central axis; an inner chamber formed between the tube and the shaft; and several roller elements arranged in the inner chamber and around the head of the shaft, each roller element including at least one contour in active engagement with the internal contour of the tube and the external contour of the head, wherein the position of the head is axially adjustable essentially by rotation of the head relative to the roller elements.

PRIOR ART

Such a device is, for example, known from CH 290 685 within the meaning of a planetary-rolling-threaded-spindle drive. Planets, which are substantially axially fixed and into which a threaded spindle lying inside plunges, act together with a tubular nut in a rolling manner relative to the nut. This device for converting a rotary motion into an axial motion works very effectively and is long lasting due to the fact that the planets roll off in the manner of roller elements, and since no threads or contours are arranged on the outside. Dirt accumulation can be avoided in this way, so that the working life of the whole drive is increased. The use of a tube, compared with a solid spindle, reduces the masses to be moved. The motion essentially is effected inside the tube, so that the tube itself constitutes a protection for the parts moved relative to each other. However, this protective function is lessened by the fact that the shaft bearing the threaded spindle rotates relative to the tubular nut in the sealing region, so that not only the sealing is subject to an additional wear, but also dirt particles cannot be reliably kept away from the inner chamber over the long term (See DE AS 1 043 743).

DE-A 44 07 537 discloses the use of roller elements with different contours, in which each roller element meshes into the interior contour of the tubular nut or into the exterior contour of the spindle.

From AT-E 0 843 it is known to position the roller elements in an axial direction counter to a force of elastic elements to safeguard against shock. However, it is not intended to uncouple the drive from the force flow by use of these elastic elements.

SUMMARY OF THE INVENTION

Based on this state of the art, it is an object of the invention to provide a device of the type first mentioned above for converting a rotary motion into an axial so a protection against exterior influences is afforded in an easy manner.

The above and other objects are accomplished according to the invention by the provision of a device for converting a rotary motion into an axial motion, comprising: an outer tube with internal contours; an inner shaft having a head including external contours, the inner shaft having a central axis; an inner chamber formed between the tube and the shaft; several roller elements arranged in the inner chamber and around the head of the shaft, each roller element including at least one contour in active engagement with at least one of the internal contour of the tube and the external contour of the head, wherein the head and roller elements are axially displaceable relative to the tube essentially by rotation of the head relative to the roller elements during which the head remains essentially axially non-displaceable relative to the roller elements; a tubular element arranged coaxially with respect to the central axis of the shaft and being axially translational relative to the outer tube; and an elastic mechanism presenting a preset axial force biasing the shaft in a direction of the central axis relative to the tubular element such that when the device is actuated for rotating the shaft relative to the outer tube, if the preset axial force of the elastic mechanism is overcome by a resistance against axial translation of the tubular element relative to the outer tube, the head of the shaft becomes actively engaged with the tubular element for purposes of force transmission.

Hence, from the outside, we have the picture of a piston rod that plunges into a cylinder, since due to the translational motion between tube and the tubular element surrounding the shaft coaxially, rotation is no longer visible. This creates the structural prerequisites for a sealing on a smooth surface without rotation between the parts to be sealed against one another, so that the protection of the mechanical drive against dirt is increased. If the interior of the tube is closed on the side opposite to the seal, it is possible to reliably apply an oil lubrication over a long period of time which, compared with known drives, increases efficiency and working life of the device. At the same time the drive becomes quieter, and the inside space is cooled by the oil volume in the inner chamber. Additionally, the shaft diameter can be adjusted to its respective task, since the shaft no longer needs to perform the sealing function at the same time.

DETAILED DESCRIPTION OF A PREFERRED EMBODIMENT

The invention will now be described in more detail, by example, with reference to the accompanying figures. The embodiments are merely examples, which should not limit the inventive concept to any particular physical configuration.

Figure 6:
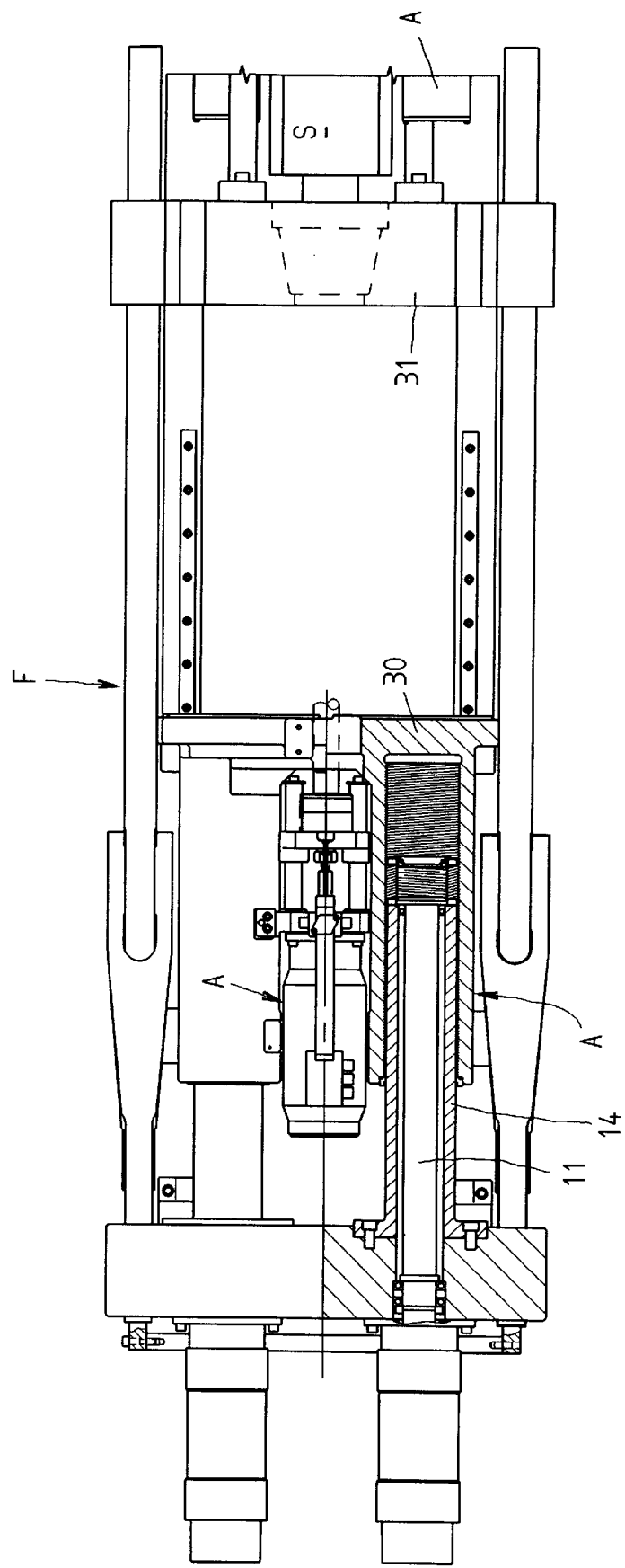

The embodiments show different devices for converting a rotary motion into an axial motion, which is frequently necessary in the field of electromechanical drives, in order to transfer the rotary motion of the motor into a translational motion. There are various applications for such devices. The device, for example, can be applied according to FIG. 6 to an injection molding machine for plastics as drive unit A. The drive units on the mold closing side, as well as those on the injection molding side, ejectors and the like, come into consideration as drive units. For example, the movable mold carrier 30 can be moved towards and away from the stationary mold carrier 31 by the drive represented on the bottom left side of FIG. 6, and the closing force is generated by the mold closing unit F, so that if a casting mold, not shown, is then provided, plastifiable material is injected into this mold by the injection molding unit S.

Figure 1:
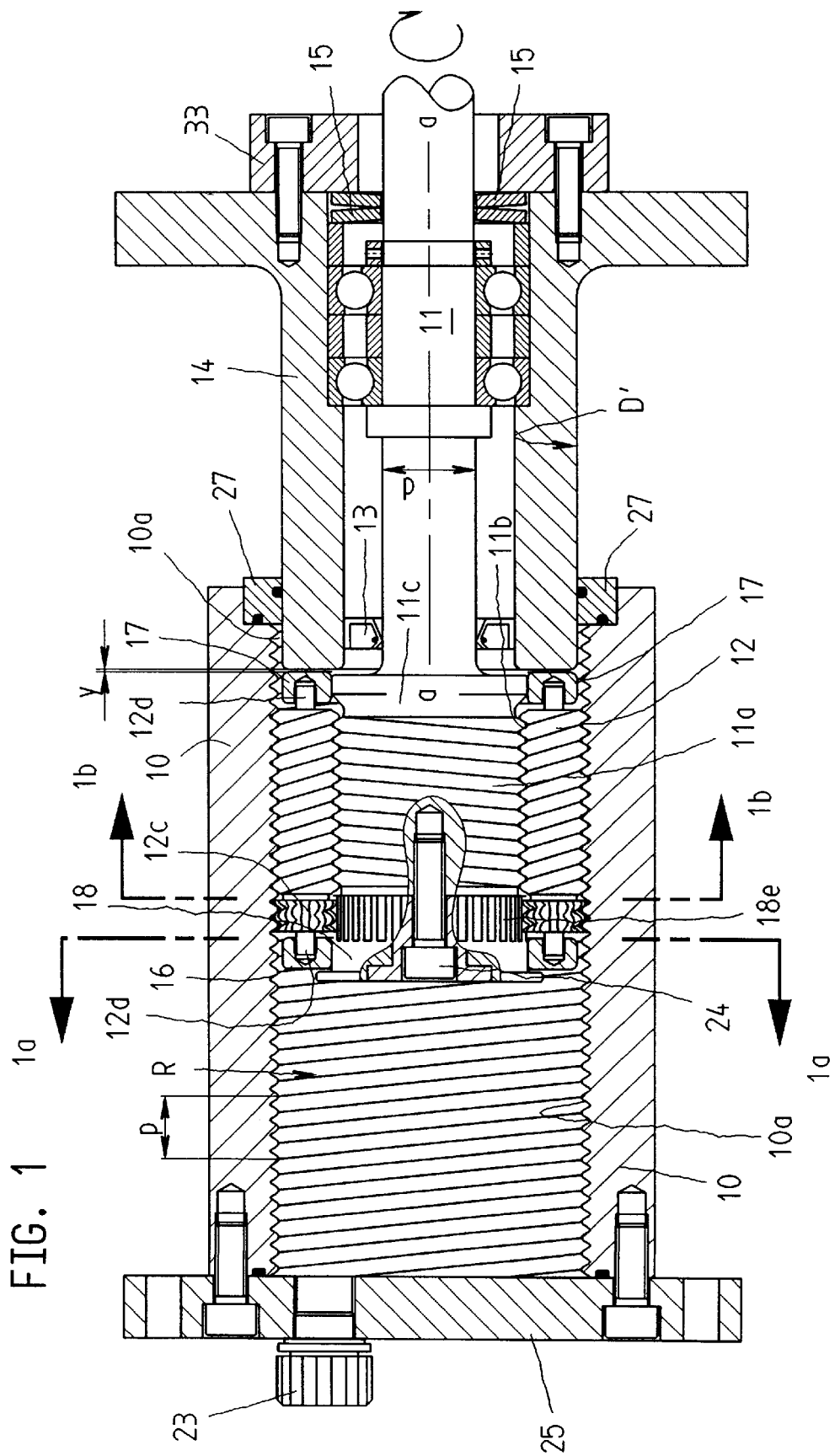
FIG. 1 a section through a device with identical roller elements.

According to FIG. 1, such a device comprises an outer tube 10 with internal contours 10a, an inner shaft 11 with head 11a with external contours 11b and several roller elements 12 arranged in the inner chamber R formed between tube 10 and shaft 11 around head 11a. The roller elements have at least one contour, which fits into the internal contour 10a and the external contour 11b, or as in the embodiment of FIG. 3 into the two different contours. Matching of different contours to each other is possible, so that ideal thread pitches somehow or other can be realized, which in the end can also lead to an axial motion that no longer exists. If a rotary motion of one part is effected, a corresponding translated rotary motion of the other part is effected with a changed number of revolutions. The rotary motion to be converted can be initiated via the tube 10 as well as via the shaft 11.

The position of the head 11a of the shaft 11 can be adjusted essentially by rotation relative to the roller elements 12. An axial motion between the head 11a of the shaft 11 and the roller elements 12 is avoided for the most part, aside from play or from the axial motion of the balls inside the bore hole 28 in the embodiment of FIG. 4. Thus far, shaft 11 and roller elements 12 create a unit moving together relative to the tube 10.

The basic construction is explained in connection with FIGS. 1a and 1b. The inner chamber R of tube 10 is closed on one side by the shaft 11 and on the other side by a covering 25. Inner chamber R can be aired via a ventilation 23 when the shaft 11 is in motion. This inner chamber R can be closed in such a way that an oil lubrication can be applied inside, so that an easier movement of the protected parts in the inner chamber R is possible while simultaneously, a silencing and cooling is effected. The inner chamber need not be filled completely with oil in order to obtain this effect. A partial filling is sufficient, wherein an air exchange via the ventilation 23 is provided. In order to avoid the penetration of dirt, a filter can be mounted into the ventilation 23. If, on the other hand, the inner chamber is filled completely, it is necessary to provide a compensating chamber for the volume displaced by the motion. Even though the oil in this case also can be pumped in a circuit, if necessary via an additional cooler, the mere motion of the oil may be sufficient for cooling, as a consequence of the actuation of the device.

Figure 1A:
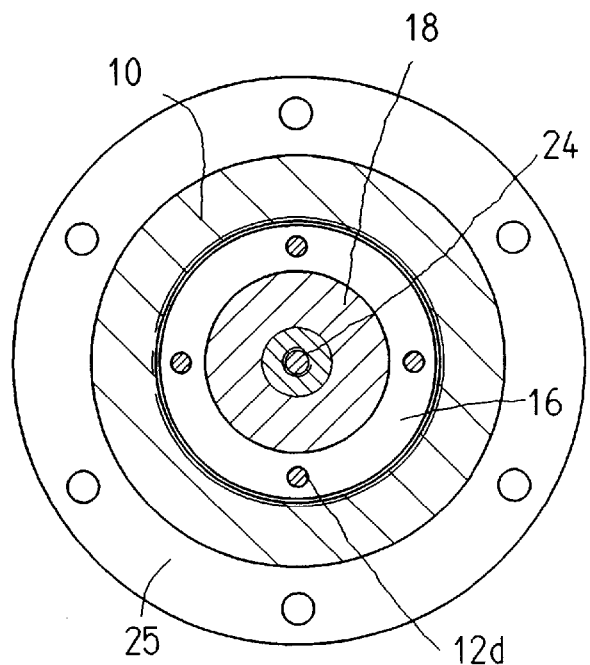
FIG. 1a, 1b sections through the representation in accordance with FIG. 1 according to the lines 1a—1a and 1b—1b, respectively, FIG. 2 an enlarged section in the area of a head of the shaft in a second embodiment without forced guidance, FIG. 3 a third embodiment in a representation according to FIG. 1, wherein the roller element is provided with different contours, FIG. 4 a section through a device according to FIG. 1 in a further embodiment, in which balls are used as roller elements, FIG. 5 a section through a hollow shaft motor, FIG. 6 a top view of a portion of an injection molding machine for plastics, FIG. 7 a top view in partial section of a closing unit of an injection molding machine for plastics in a further embodiment, FIG. 8 a representation according to FIG. 2 in a further embodiment.
Figure 1B:
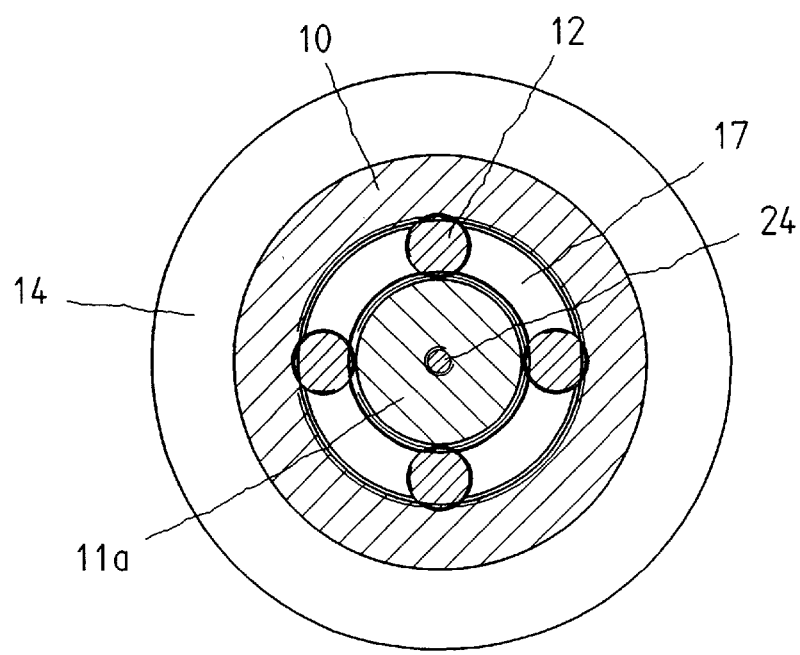
Figure 2:
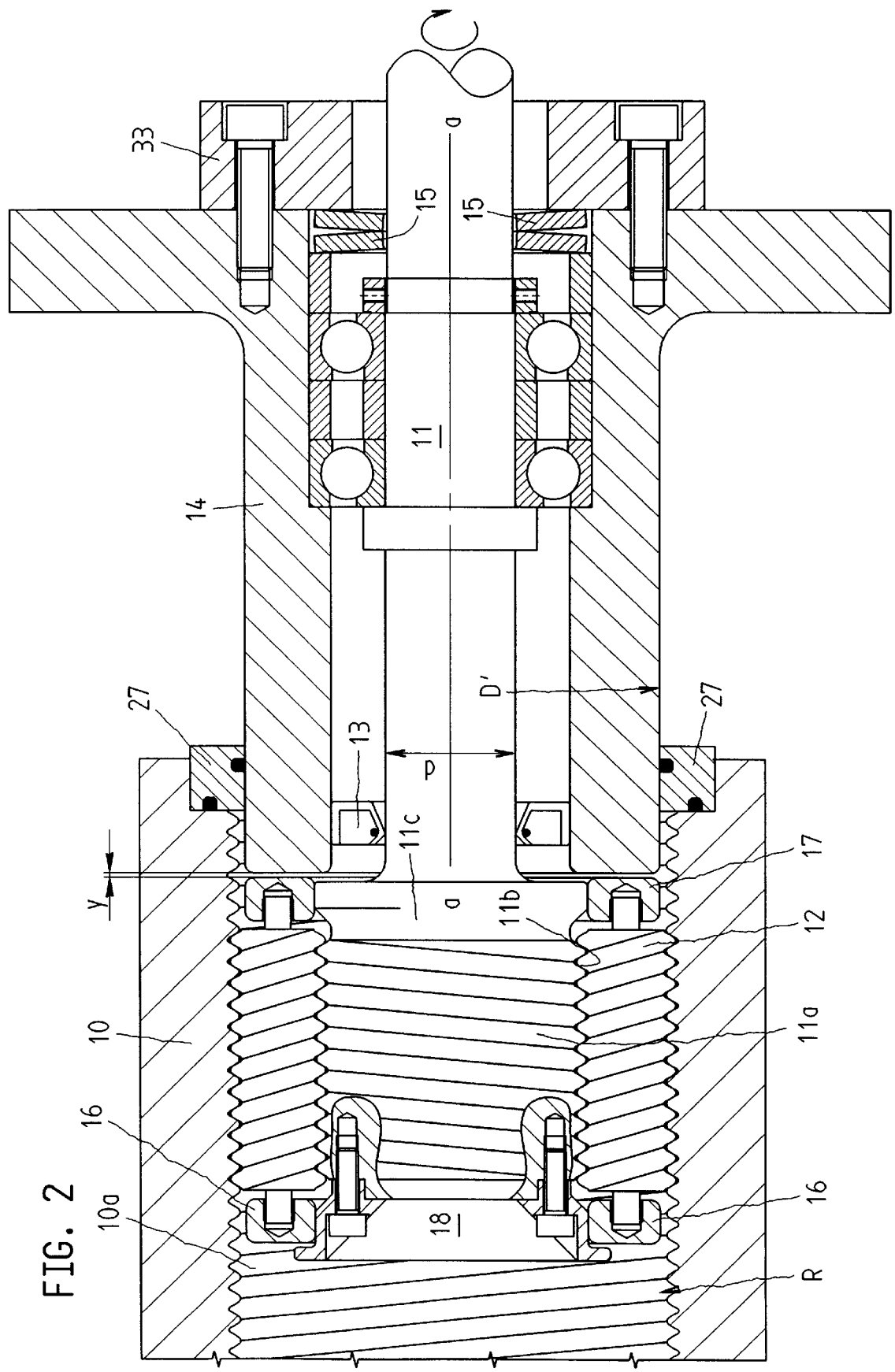

The FIGS. 1a, 1b also make clear that the roller elements are held inside bearings. To this end, at the head 11a, a disc 18 is fixed, which serves as axial guidance for a bearing disc 16 of the roller elements 12. Bearing pins 12d of the roller elements plunge into the bearing disc 16. At the opposite end, the roller pins 12d are positioned in a further bearing disc 17, which rotates around the neck 11c. The disc 18 is connected with the head via a fixing means 24.

Basically it is desired to create all roller elements 12 identically. First of all, there exists the possibility to design the internal contour 10a with several threads within the pitch p and to provide a corresponding number of identical roller elements 12 as planets.

In FIG. 1 (also see FIG. 1b) four planets are provided for a four-start thread. The roller elements 12 can be separated from one another, in a manner not shown, by spacers arranged on their orbit. These spacers replace the otherwise required bearing via the bearing discs 16, 17.

The shaft 11 itself has a relatively small diameter d. It is coaxially surrounded by a tubular element 14, which, for example, is flanged at one end to a seat 33. The outside diameter D' of the tubular element corresponds nearly or almost to the inside diameter of the contour 10a of the tube 10. A sealing of the inner chamber R is made by a gasket 27 between the tube 10 and the tubular element 14, wherein when the shaft 11 rotates, the impression from the outside being that a piston rod plunges into a cylinder, since both elements only perform a translational motion towards each other. This also facilitates the sealing of the inner chamber R, so that a sound-dampening and cooling oil lubrication can be applied reliably over a longer period of time.

Figure 8:
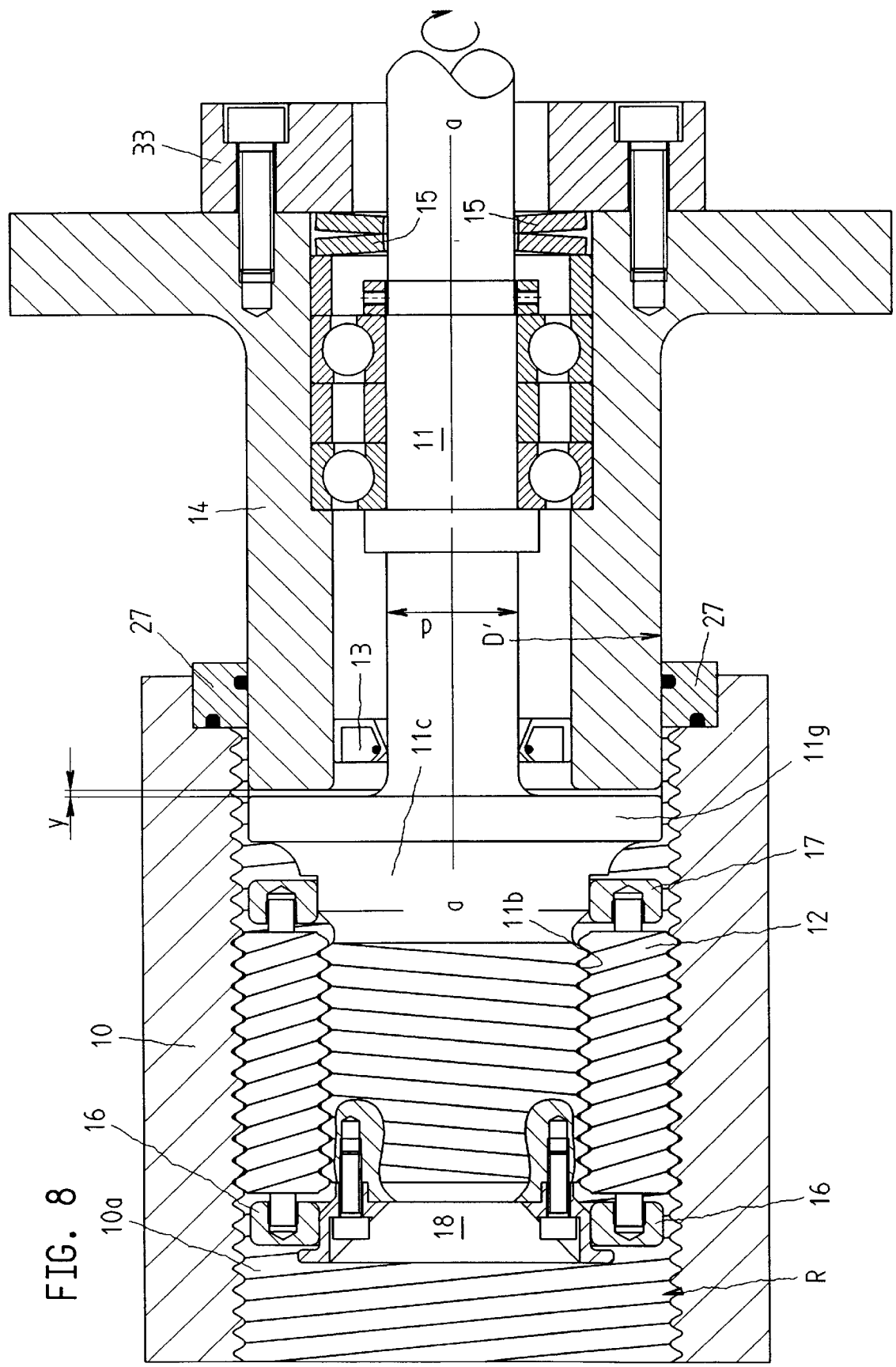

Owing to the effect of elastic means 15, a distance y is maintained between the bearing disc 1 and the tubular element 14 during the motion. For this, the elastic means is dimensioned in a way that the friction forces occurring during the motion do not lead to a complete reduction of the distance y. If, however, a higher force has to be exerted due to a resistance, then the shaft 11 comes to rest against the bearing disc 17 of the roller elements 12, and if necessary, also directly at the tubular element 14. According to FIG. 8, shaft 11 also can come to rest against the tubular element 14 in that at the neck 11c of the shaft, there is provided a collar 11g adjusted to the tubular element 14 with respect to its diameter, which after reduction of the distance y rests at the tubular element like a blocking disc. The positioning of the bearing disc 17 is thus independent from the blocking process. In both cases, the shaft 11 and a drive motor assigned to it are uncoupled from the force flow, at least with respect to the rotational forces, and the forces can be discharged via the more stable tubular element 14.

For that reason the shaft 11 can also be dimensioned such that it is suited to transfer essentially low rotational forces during an advance movement, whereas when higher forces are generated, other elements absorb the forces. As a result, the moments of inertia of the spindle can be reduced, and the masses to be moved are reduced as well. Nevertheless, a suitable cross section is available for the transmission of the actual force.

Figure 7:
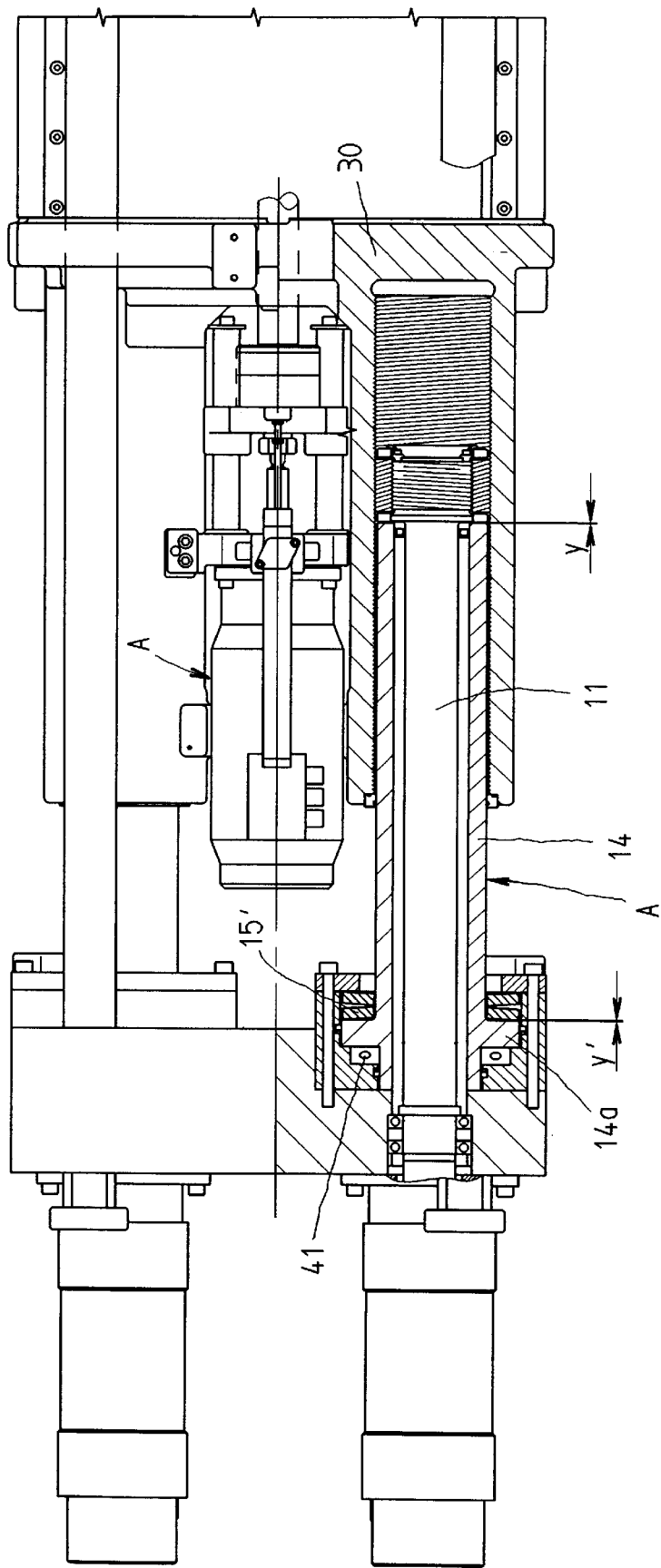

This is possible, for example, in the preferred application area of an injection molding machine, wherein the mold is closed by a first drive, while the considerably higher pressure for keeping the mold closed is generated by a second drive. FIG. 7 shows an example of a second drive configured as a piston-cylinder-unit, which, however, also can be arranged at another location within the closing unit, as already known in the prior art. In FIG. 7, the piston 14a is connected with the tubular element 14; to be more precise, they form one piece. The tubular element 14 is axially movable against the force of elastic resetting means 15', for example, by supplying a hydraulic medium into the cylinder chamber 41. During the mold closure, the mold at first is closed by the device, until the mold halves fit together. As soon as the force of the elastic means 15 is exceeded, the shaft 11 is uncoupled from the force flow. Now the actual closing force, which only requires a short deforming path, can be generated by the short-lift piston-cylinder-unit. On the other hand, supplying the cylinder chamber 41 with hydraulic medium can reduce the distance y' while at the same time reducing the distance y, in order to uncouple the shaft 11.

FIG. 1 also provides for a forced guidance between head 11a and roller elements 12. This is effected in that the head 11a or the disc 18 is provided with a toothing 18e, which closely intermeshes with a toothing 12c of the roller elements 12. Fastening is made via a central fixing means 24, with which the guide for the bearing disc 16 is fixed at the head 11a of the shaft 11. A forced guidance relative to the internal thread 10a of the tube 10 is not realized in that way.

Figure 3:
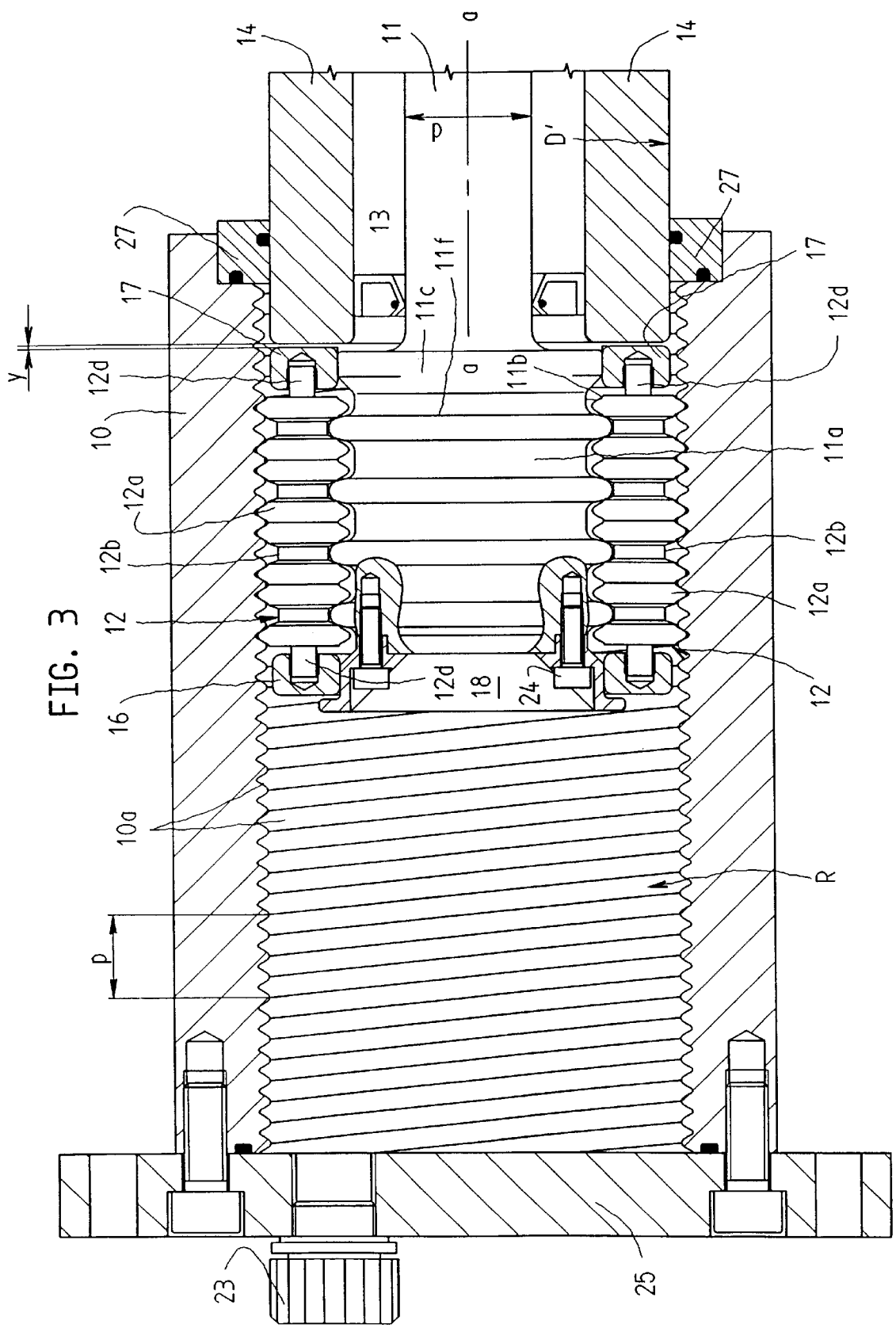

In the third embodiment of FIG. 3, the roller elements 12 are provided with different contours 12a, 12b with different diameters. The contour 12a with the larger outside diameter moves with a rolling contact on the internal contour 10a of the tube 10. The contour 12b with the smaller diameter moves with a rolling contact on ribs 11f of the external contour of the head 11a of the shaft 11. A further transmission of the rotational speed is thus made possible. The contours 12a, 12b of the roller elements 12 are formed together in an overlapping manner in alternating sections. Only the internal contour 10a of the tube 10 is provided with a pitch and has multiple turns, so that several identical planets are provided as roller elements 12.

Figure 4:
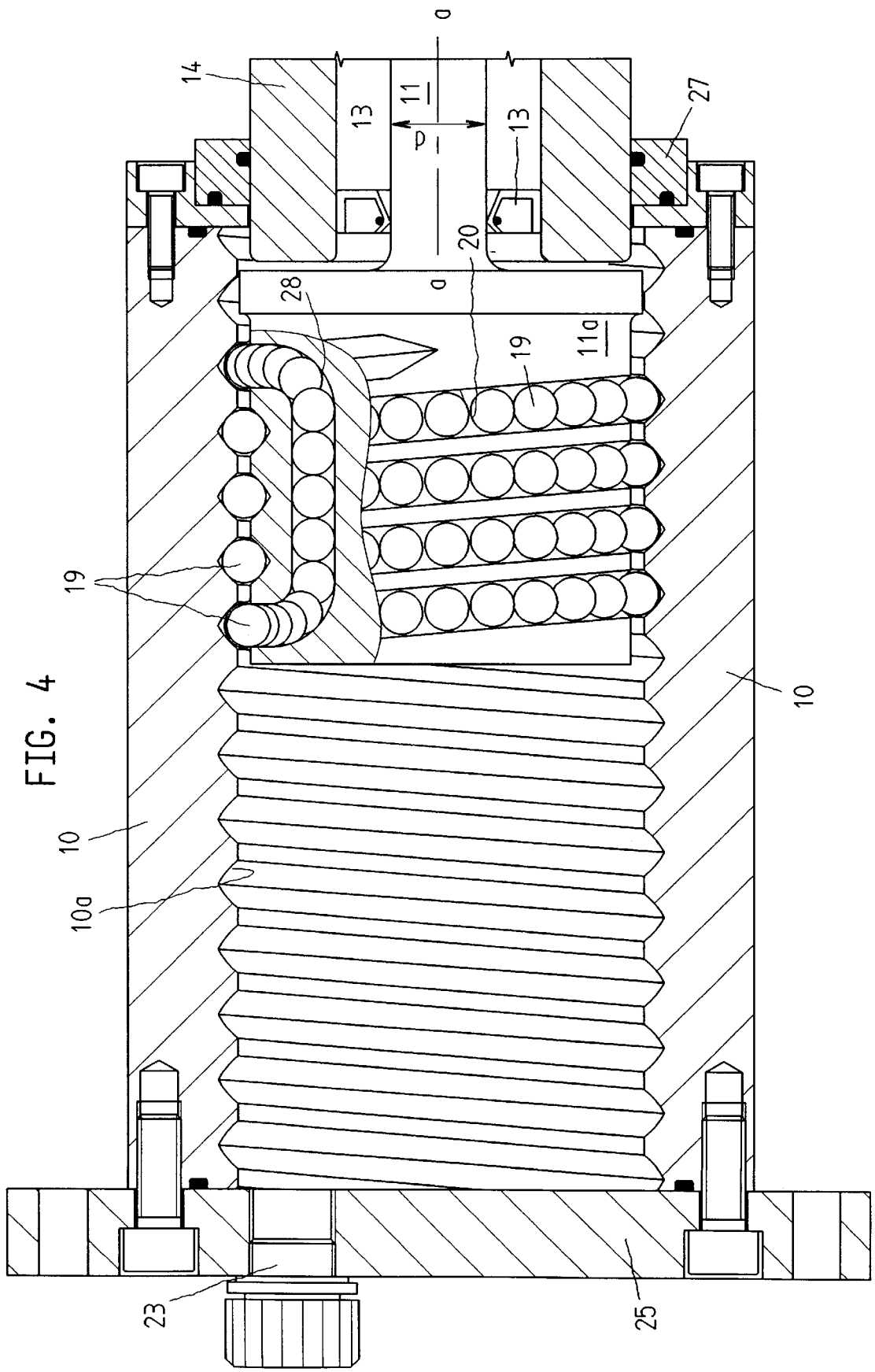

According to FIG. 4, instead of the roller elements, balls 19 can be provided. Internal contour 10a and external contour 11a then are rolling surfaces for the balls 19. The balls are guided within a ball cage 20, which secures a circulation of the balls via a bore hole 28 lying in the head of the ball cage 20.

Figure 5:
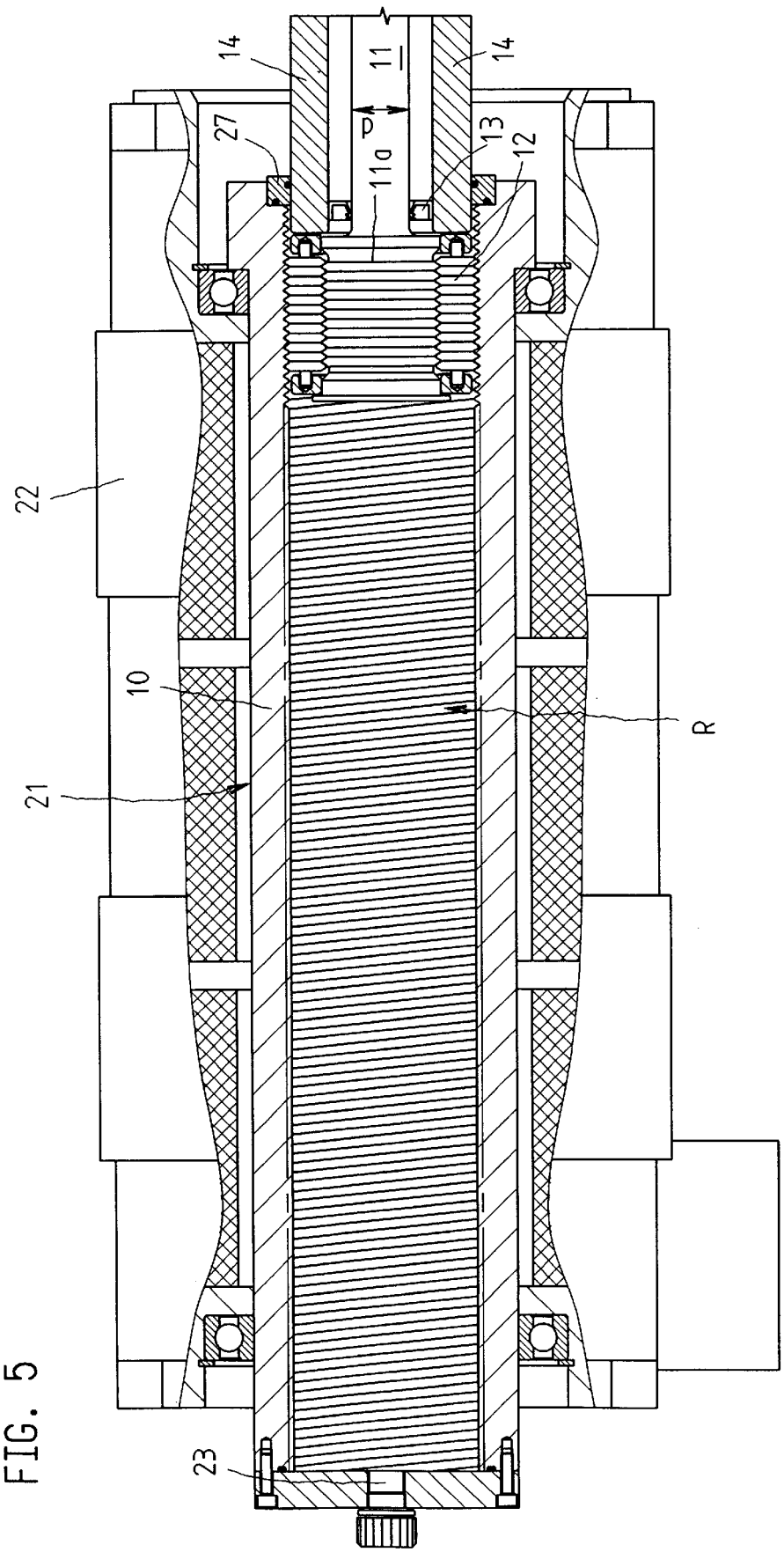

According to FIG. 5, the tube 10 can also be the rotor 21 or the part of a rotor of a hollow shaft motor 22. When actuated, the shaft 11 plunges into the hollow shaft motor, wherein the length of the tube 10 determines the maximum stroke of the unit as well. Since the tube can also be longer than the motor, the length of the motor does not determine the maximum stroke.

It is evident that this description can be subject to different modifications, changes and adjustments, ranging within the area of equivalents of the annexed claims.

What is claimed is:

1. A device for converting a rotary motion into an axial motion, comprising:

an outer tube with internal contours;

an inner shaft having a head including external contours, the inner shaft having a central axis;

an inner chamber formed between the tube and the shaft;

several roller elements arranged in the inner chamber and around the head of the shaft, each roller element including at least one contour in active engagement with at least one of the internal contour of the tube and the external contour of the head, wherein the head and roller elements are axially displaceable relative to the tube essentially by rotation of the head relative to the roller elements during which the head remains essentially axially non-displaceable relative to the roller elements;

a tubular element arranged coaxially with respect to the central axis of the shaft and being axially translational relative to the outer tube; and an elastic mechanism presenting a preset axial force biasing the shaft in a direction of the central axis relative to the tubular element such when the device is actuated for rotating the shaft relative to the outer tube, if the preset axial force of the elastic mechanism is overcome by a resistance against axial translation of the tubular element relative to the outer tube, the head of the shaft becomes actively engaged with the tubular element for purposes of force transmission.

2. The device according to claim 1, wherein the tubular element is arranged to move independently of the rotation of the inner shaft, and the device further includes means for sealing the outer tube relative to the tubular element during axial motion between the outer tube and the tubular element.

3. The device according to claim 1, wherein the shaft is arranged so that it is axially displaceable against the force of the elastic mechanism and so that it comes into abutting contact with the tubular element.

4. The device according to claim 3, and further comprising a bearing disc coupled to the roller element and being arranged so that the shaft comes into contact with the tubular element via the bearing disc when the preset axial force of the elastic mechanism is exceeded.

5. The device according to claim 3, wherein the shaft includes a collar arranged so that the shaft comes into contact with the tubular element via the collar when the preset axial force of the elastic mechanism is exceeded.

6. The device according to claim 3, and further including a drive for generating an axial force for translating the tubular element relative to the outer tube.

7. The device according to claim 6, wherein the drive comprises a piston-cylinder unit having a piston connected with the tubular element.

8. The device according to claim 1, wherein the roller elements comprise balls guided in a cage.

9. The device according to claim 1, wherein the outer tube comprises at least partially a rotor of a hollow shaft motor into which the shaft plunges.

* * * * *